Figure 1:
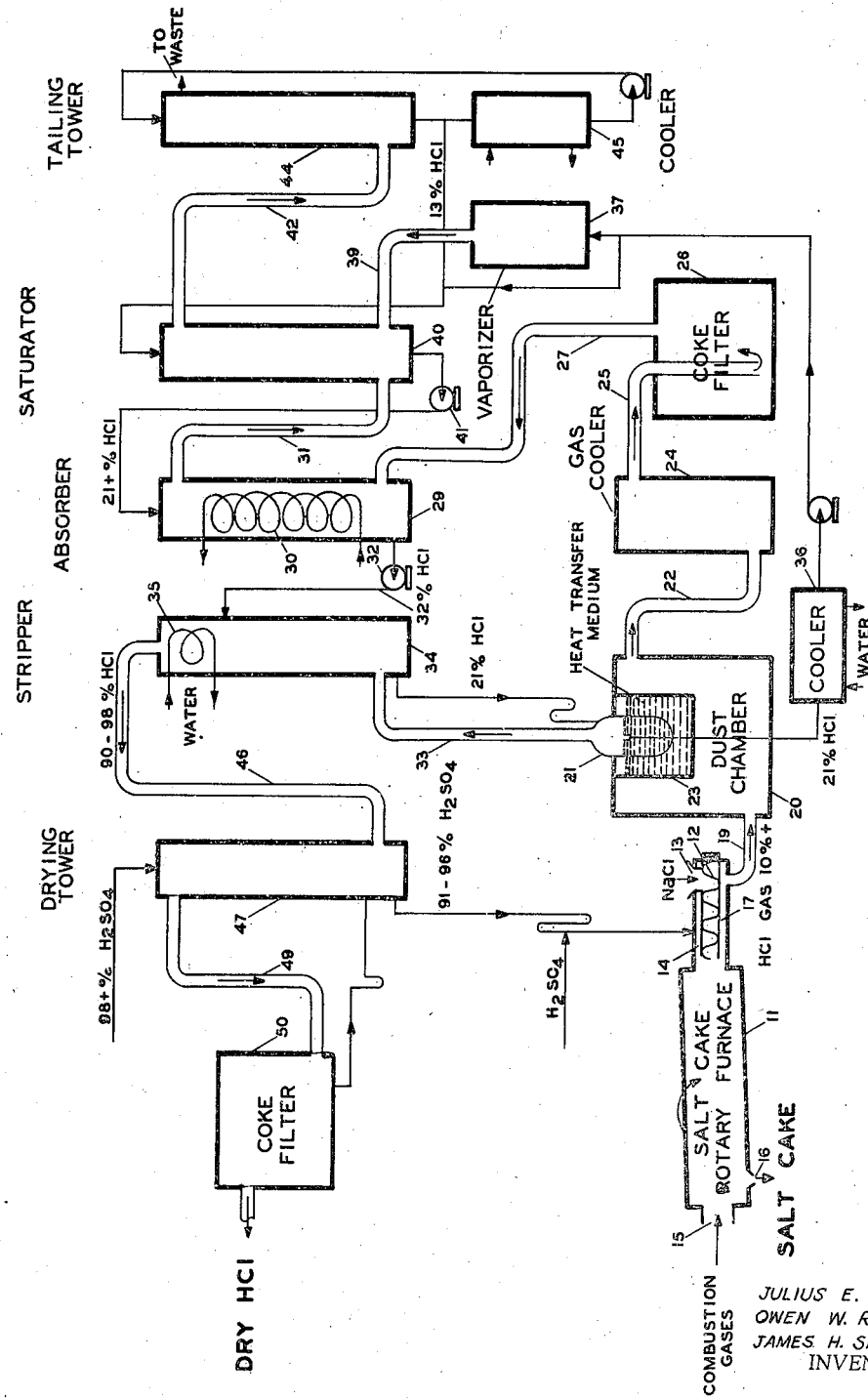

July 12, 1949.　　　J. E. NACHOD ET AL　　　2,475,752

HYDROGEN CHLORIDE MANUFACTURE

Filed June 1, 1945　　　　　　　　　　　　3 Sheets-Sheet 1

JULIUS E. NACHOD
OWEN W. RIDEOUT
JAMES H. SHAPLEIGH
INVENTORS

BY　*Cleveland B. Dillebaugh*
　　　　ATTORNEY

JULIUS E. NACHOD
OWEN W. RIDEOUT
JAMES H. SHAPLEIGH
INVENTORS

July 12, 1949.　　　J. E. NACHOD ET AL　　　2,475,752
HYDROGEN CHLORIDE MANUFACTURE
Filed June 1, 1945　　　　　　　　　　　3 Sheets-Sheet 3

JULIUS E. NACHOD
OWEN W. RIDEOUT
JAMES H. SHAPLEIGH
INVENTORS

BY
ATTORNEY

Patented July 12, 1949

2,475,752

UNITED STATES PATENT OFFICE 2,475,752

HYDROGEN CHLORIDE MANUFACTURE

Julius E. Nachod, Owen W. Rideout, and James H. Shapleigh, Wilmington, Del., assignors to Hercules Powder Company, Wilmington, Del., a corporation of Delaware Application June 1, 1945, Serial No. 596,994

13 Claims. (Cl. 23—155)

This invention relates to a process for the manufacture of hydrogen chloride, and more particularly to an improved process for making hydrgen chloride from the interaction of sodium chloride and sulfuric acid and recovering dry hydrogen chloride from the product gas.

The preparation of hydrogen chloride from (1) chlorides, such as sodium chloride, reacting with acids, as sulfuric, (2) sodium chloride reacting with nitre cake, (3) the burning of hydrogen with chlorine, etc., are well known.

When hydrochloric acid, i. e., aqueous hydrogen chloride, has been desired, the principal difficulties have been associated with the methods and apparatus used for absorbing the hydrogen chloride in water in an efficient manner. For the recovery of substantially pure hydrogen chloride gas, free of water, nitrogen, carbon dioxide, etc., there have been difficulties in effecting the desired separation of the hydrogen chloride from the associated inert diluents, etc.

With increased demands for organic chlorides in the manufacture of synthetic substances, such as ethyl chloride to make ethyl cellulose, an important synthetic in the plastics field, ethyl chloride in the manufacture of lead tetraethyl for high antiknock gasoline, and the like, the demand has increased for more efficient and more economical methods of producing dry hydrogen chloride gas. The principal methods available for producing dry hydrogen chloride are as follows: (1) treating approximately 20° Baumé (about 32% HCl) hydrochloric acid with either about 93-98% sulfuric acid or by stripping in a fractionating tower, to obtain a wet gas containing about 90-98% hydrogen chloride, and then completing the drying with strong sulfuric acid. The weakened sulfuric acid resulting therefrom must then either be concentrated or sold at a lower value as dilute acid; (2) reacting dry chlorine and hydrogen directly to form dry hydrogen chloride; and (3) production of dry hydrogen chloride by means of the chlorsulfonic acid method, which again involves sulfuric acid concentration. Thus, the most economical source of hydrogen chloride, namely, rock salt and sulfuric acid, which react to yield hydrogen chloride, which in turn is recovered from the gaseous reaction product, although being advantageous in the production of hydrochloric acid, possesses certain disadvantages in the production of dry hydrogen chloride.

Now, in accordance with the present invention, a process has been discovered which makes it possible to produce dry hydrogen chloride from sodium chloride and sulfuric acid without the necessity of either concentrating sulfuric acid in a concentrator or disposing of the acid as a dilute acid. Further, it has been discovered that it is possible to recover hydrogen chloride substantially completely, and in a pure form, from a gaseous mixture of it with a major proportion of inert diluents, in an economical and efficient manner.

Generally described, the process in accordance with this invention and as indicated in the drawings constituting a part of the specification is made up of a coordinated sequence of steps comprising (1) a first step in which sodium chloride and sulfuric acid are reacted in a rotary, internally heated, furnace to produce a gaseous mixture containing hydrogen chloride, water vapor and inert diluents; (2) a second step in which most of the hydrogen chloride and a large portion of the water, in the hydrogen chloride-containing gases to be treated for hydrogen chloride recovery, are absorbed in substantially constant boiling point, or stronger, hydrochloric acid to give an acid above about 21% HCl concentration and leaving an unabsorbed effluent gas; (3) a third step in which the greater than 21% acid is fractionated or stripped to remove, as strong hydrogen chloride gas, a portion of the hydrogen chloride absorbed in the second step and to produce a substantially constant boiling point residual acid; (4) a fourth step in which the strong hydrogen chloride gas (containing up to 10–15% water vapor) is countercurrently contacted with concentrated sulfuric acid whereby substantially dry hydrogen chloride is obtained as an effluent gas and the sulfuric acid containing the absorbed water is passed to the furnace for reaction with sodium chloride; (5) a fifth step in which the residual acid produced in step three, which contains the water absorbed in step two, is mixed with a dilute acid produced in a step six, and the mixed acids are contacted with the unabsorbed effluent gas from step two, at a predetermined temperature higher than in step two and such that the effluent gas therefrom contains a larger amount of water than that of the initial gas, an acid of about constant boiling point composition or greater being obtained and returned to step two; (6) and a sixth step in which the effluent gas from step five is countercurrently contacted with a cooled circulating body of dilute acid and the remaining hydrogen chloride is converted, with part of the water therein to dilute acid of the same composition as the circulating acid, and the effluent gas therefrom contains an amount of water substantially identical with that of the entering gas, the dilute acid formed in step six being returned to step five where it is mixed with the acid from step three to form the absorbing acid of step five for the unabsorbed effluent gas of step two.

Thus, in accordance with the process of this invention, a dry hydrogen chloride gas is produced from sodium chloride and sulfuric acid in an economical and efficient manner, wherein strong sulfuric acid is utilized for drying wet hydrogen chloride gas, and yet there is elimination of the necessity of concentrating the resultant diluted acid. By utilizing the coordinated combination of steps of the process, the water absorbed by the sulfuric acid in the drying step is returned to the hydrogen chloride stream in the hydrogen chloride-generating furnace. Still further, in accordance with the process of this invention, the net water introduced into the hydrogen chloride stream in the hydrogen chloride generator, principally as a product of combustion in the heating gas, may be substantially completely separated from the hydrogen chloride and discharged to the atmosphere or otherwise disposed of without loss of other valuable substances therewith.

Figure 2:
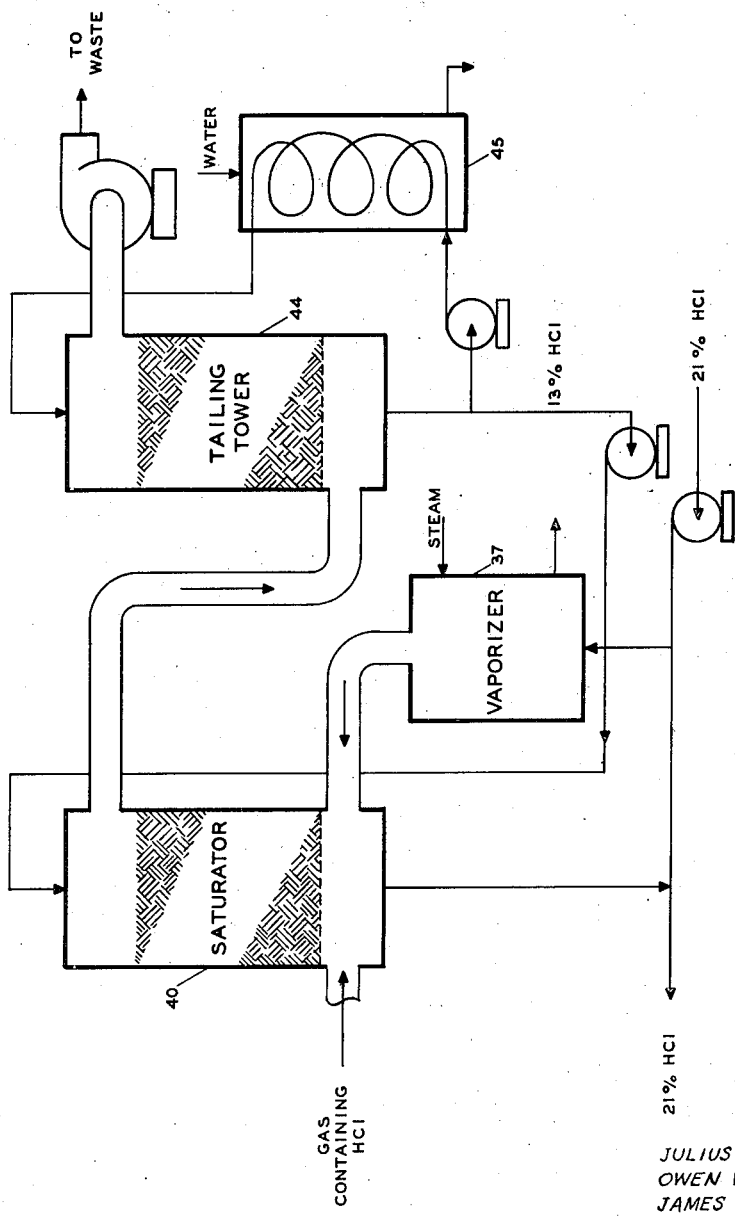
Figure 4:
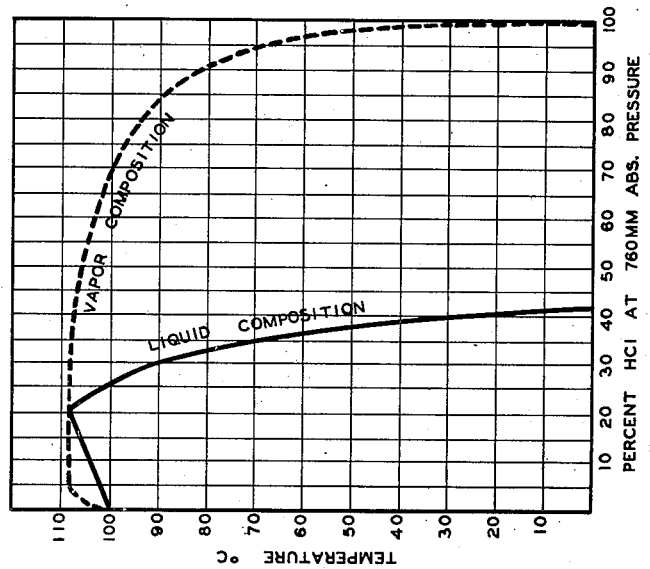
Figure 3:
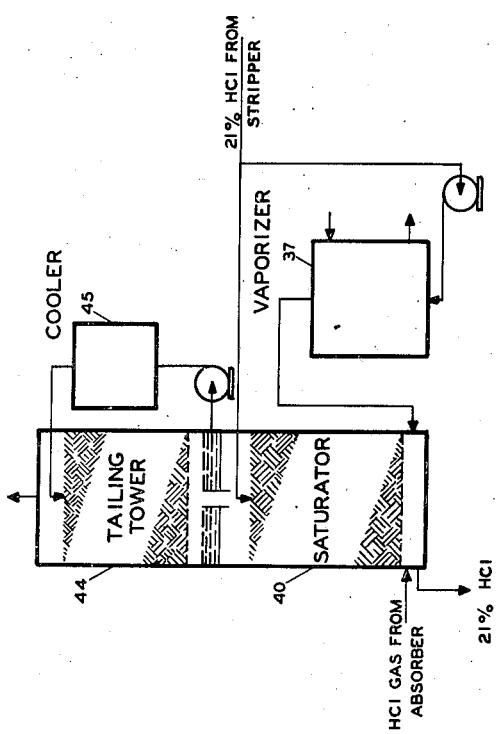

Having now indicated in a general way the nature and purpose of the invention, there follows a more detailed description of preferred embodiments thereof with reference to the accompanying drawing in which: Fig. 1 is a diagrammatic flow sheet of the preparation and recovery of hydrogen chloride in accordance with the invention; Fig. 2 is a diagrammatic representation of a portion of the process indicated in Fig. 1 with certain modifications; Fig. 3 shows diagrammatically a modification of the arrangement of Fig. 2; and Fig. 4 is a temperature-composition graph for the liquid and gaseous phases of the hydrogen chloride-water two phase system.

The invention is illustrated by the following example, which is described with reference to Fig. 1. Sodium chloride was fed to the charging end of a substantially horizontal salt cake rotary furnace 11 by means of a charge chute 13, and a screw conveyor 12 communicating with the charging end and adapted to be heated by hot gases issuing from the furnace. Sulfuric acid of about 96% strength was simultaneously fed to the furnace by separate conveyor (conduit) means 14 communicating with the same charging end of the furnace and adapted to have the acid preheated by the hot gases issuing from the furnace. The sodium chloride (salt) and acid were mixed and reacted in the weight ratio of about 1.2 to 1 while flowing countercurrent to and being heated by hot combustion gases delivered to the furnace through an opening 15 in the other (burner) end thereof. The reaction is represented by the equation:

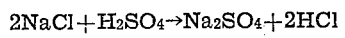

$$2NaCl + H_2SO_4 \rightarrow Na_2SO_4 + 2HCl$$

The resulting salt cake ($Na_2SO_4$) was discharged through an opening 16 in the burner (hotter) end of the furnace, while the hydrogen chloride (HCl), mixed with water vapor ($H_2O$) and the combustion gas (not including water), was discharged from the charging end of the furnace, at a temperature of about 600° F., through an annular space 17 around the screw conveyor.

The furnace gas on the basis of one hour of flow, contained 1390 lbs. of HCl, 370 lbs. of $H_2O$, and 12,700 lbs. of combustion gas (carbon dioxide, nitrogen, oxygen, etc.). This gas was passed, by means of a conduit 19 to a dust chamber 20 where the solid particles of salt, etc., were separated by gravity, and a portion of the sensible heat was transferred, by means of a heat transfer medium, to a boiling pot 21 communicating with the bottom portion of a stripper 34 for stripping hydrogen chloride from an acid of greater than constant boiling point composition.

The gas was passed next through a conduit 22 to a gas cooler 24 where it was cool with water by indirect heat transfer, and then conducted through a conduit 25 to a coke filter 26 for further purification.

The cooled and filtered gas was then delivered by means of a conduit 27 to the lower portion of an absorber 29 where it was countercurrently contacted with greater than 21% hydrochloric acid introduced at the top of the absorber. Heat of absorption was removed indirectly by means of a cooling coil 30 carrying water and placed inside the absorber. By this means, the temperature at the top of the absorber, and consequently the temperature of the effluent gas withdrawn by a conduit 31, was maintained at about 86° F.

About 9920 lbs. of 32% acid was withdrawn from the bottom of the absorber, per hour, and delivered by means of a pump 32 to the upper portion of a stripper 34, where it was stripped or fractionated, or separated into an effluent gas fraction (98% HCl), and into a substantially constant boiling point (about 21% HCl) fraction withdrawn from the bottom of the stripper, the principle of which will be understood with reference to Fig. 4. By means of a cooling coil 35 in the upper portion of the stripper, the desired temperature and corresponding effluent gas composition were maintained. Thus, to obtain a gas with 98% hydrogen chloride, the temperature was maintained below about 60° C. (see Fig. 4).

Since the stripping process is endothermic, heat must be supplied to the stripper. The required heat was supplied by a portion of the sensible heat of the furnace gas. Constant boiling acid (21%) was delivered from the bottom of the stripper to a boiling pot 21 with an inside lining of tantalum. The pot was maintained partially immersed in a heat transfer medium contained in a vesel 23 which was positioned partially inside the dust chamber 20 and heated by the hot furnace gas. A portion of the about 21% acid was vaporized, without substantial change in composition, and the vapors, carrying the added heat of vaporization, were returned by means of a conduit 33 to the bottom of the stripper. By subsequent condensation, the heat of vaporization was given up and utilized for the partial separation of the hydrogen chloride from the water. Any additional heat requirements were met by means of usual heating coil means (not shown) placed in a lower portion of the stripper. About 1420 lbs. of 98% HCl and 8500 lbs. of about 21% acid were recovered from the stripper per hour.

The 8500 lbs. of about 21% acid was cooled indirectly by water in a cooler 36 to a temperature of about 135° F. A portion of this acid was vaporized in a vaporizer 37 with addition thereto of about 927,000 B. t. u.'s of heat per hour and delivered by means of a conduit 39 to the lower portion of a saturator 40, to which was also delivered, to the bottom thereof, the effluent gas from the absorber through a conduit 31. The remainder of the 21% acid from the stripper, together with 651 lbs. per hour of 13.3% acid at 194° F. withdrawn from a tailing tower 44, was delivered to the top of the saturator. Thus, the absorber effluent gas, which contained per hour, 28 lbs. of HCl, 177 lbs. of H2O and 12,700 lbs. of combustion gas, was countercurrently contacted in a packed tower with a mixture of the recovered 21% acid from the stripper and about 13% acid recovered from the tailing tower, with the addition of heat, other than heat of absorption of the hydrogen chloride in water, to maintain a temperature of 135° F. at the top of the saturator. The resultant saturator effluent gas contained 87 lbs. of HCl and 935 lbs. of H2O (saturated at 135° F.), which represented an increase in HCl-content, but a decrease in HCl to H2O ratio. 7983 lbs. per hour of 22.5% hydrochloric acid was withdrawn from the bottom of the saturator and delivered by means of a pump 41 to the top of the absorber, after cooling by indirect cooling (not shown) to 86° F.

The saturator effluent gas was delivered through a conduit 42 to the bottom of a packed tailing tower 44, where it was countercurrently contacted with a circulating 13.3% hydrochloric acid. The circulating acid was withdrawn from the bottom of the tower, water cooled in a cooler 45 by indirect heat transfer to a temperature of 97° F., and returned to the top of the tower. By this means, the temperature at the top of the tower was maintained at 97° F. and the gas delivered therefrom to waste contained 1.5 lbs. of HCl, 370 lbs. of H2O and 12,700 lbs. of combustion gas, per hour. The 13.3% acid was circulated through the tower and cooler at the rate of 24 gallons per minute.

In addition to the circulating acid withdrawn from the tailing tower, 651 lbs. per hour of 13.3% acid was withdrawn at 194° F. and returned to the saturator. This represented the difference in the hydrogen chloride plus water contents of the saturator effluent gas and the tailing tower effluent gas. Thus, the 370 lbs. of water and 12,700 lbs. of combustion gas (diluent gas) of the furnace gas were discharged from the tailing tower substantially free of hydrogen chloride.

The 98% HCl gas (2% moisture) obtained from the stripper was delivered by means of a conduit 46 to a packed drying tower 47 where it was countercurrently contacted with and dried by 98+% sulfuric acid, the effluent gas therefrom then being passed through a conduit 49 to and through a coke filter 50 to yield dry hydrogen chloride. Acid spray and the like were separated from the HCl in the coke filter and returned to lower section of the drying tower. Spent sulfuric acid (91–96% H2SO4) from the bottom of the drying tower, was then delivered to the salt cake furnace, thus returning the water taken from the 98% hydrogen chloride back to the system. Any additional concentrated acid required for the reaction was mixed with the 91–96% acid prior to introduction into the furnace.

Thus, by means of the method of this invention comprising a system of cooperating elements in which there are a number of interconnecting cyclic steps resulting in an overall unified cyclic operation, sodium chloride and sulfuric acid were reacted to yield an initial gas mixture containing hydrogen chloride, water vapor and inert gaseous diluents, the initial gas mixture was separated into a first portion which was substantially pure, dry hydrogen chloride and into a second portion which consisted essentially of the water and inert gaseous diluents of the initial gas and substantially free of hydrogen chloride.

The flow of materials and functions of the cooperating steps of the saturator-tailing tower operations are more clearly followed by reference to Figs. 2 and 3. In Fig. 2, the saturator and tailing tower are shown as two separate pieces of apparatus, while in Fig. 3 they comprise lower and upper gas-liquid contacting zones in a single tower, suitable means being provided for the transfer of gas and liquid to and from the top and bottom of the two zones. As shown in Fig. 3, only approximately 21%, or substantially constant boiling point, acid is vaporized. In that case the hydrogen chloride and water are simply changed into the gaseous phase in the same ratio as in the liquid phase, as will be seen by reference to Fig. 4. The heat of vaporization of the acid is utilized in the saturator to supply the required heat of vaporization for the water required to be vaporized to change the low water content of the absorber effluent gas to the high water content of the saturator effluent gas. This required heat may be supplied by other means, such as a heating coil placed inside the saturator.

Similarly, the external cooler may be replaced by cooling means placed inside the tailing tower.

The example given hereinabove shows a reduction of the hydrogen chloride content of a gas stream from about 10% down to about 0.2–0.3% by use of a single, indirectly cooled, absorber, using about 22.5% acid, entering at 86° F., as the absorbing medium. The resulting concentrated acid (32%) was stripped to recover a portion of the hydrogen chloride therefrom, the amount of hydrogen chloride required for the water absorbed from the gas stream to give 21% acid, together with the water being retained in the residual acid from the stripper. This represents a loss in the recoverable hydrogen chloride gas in so far as the usual absorption and stripping combination is concerned.

An attempt to reduce this loss by operating with a higher temperature at the top of the absorber, thus removing a larger portion of the water in the effluent gas and, hence, less in the concentrated acid, does not solve the problem of overall loss of hydrogen chloride since, then, the hydrogen chloride loss in the effluent gas from the absorber is excessive.

By the method in accordance with this invention the hydrogen chloride is efficiently recovered from the hydrogen chloride-containing furnace gas. Furthermore, the recovery of the hydrogen chloride as a substantially pure, dry gas is made without the concurrent loss of value of sulfuric acid utilized in a drying step of the process. Further economies are effected by utilizing the heat of the gaseous products from the hydrogen-chloride producing furnace for effecting the stripping of the hydrogen chloride from the concentrated acid in the stripper.

Inasmuch as the absorption of hydrogen chloride in water (reaction to form hydrochloric acid) is highly exothermic and the solubility is greater at lower temperatures, thus necessitating cooling the furnace gas prior to absorption, the partial utilization of the sensible heat of the gas for the stripper operation accomplishes additionally part of the desired cooling of the gas.

This invention is of utility in the manufacture and recovery of hydrogen chloride. By the method of this invention, substantially pure hydrogen chloride may be efficiently and economically obtained from readily available and inexpensive sodium chloride and sulfuric acid. Further, the only other products of the process are salt cake on the one hand and separated water and combustion gases on the other hand. Still further, by utilizing the method of this invention, hydrogen chloride may be recovered from a gas containing a relatively small proportion of hydrogen chloride.

What we claim and desire to protect by Letters Patent is:

1. A method of producing substantially pure, dry hydrogen chloride gas which comprises in combination the following steps: reacting sodium chloride and sulfuric acid in a molar ratio of approximately two to one in a furnace heated internally by hot combustion gases whereby an initial gas mixture containing hydrogen chloride, water vapor and inert gaseous diluents is produced; countercurrently contacting said gas mixture with substantially constant boiling point hydrochloric acid in an absorber; withdrawing an acid from the absorber with a concentration of hydrogen chloride greater than that of constant boiling point acid and separating said acid by fractionation in a stripper into a first fraction which is substantially pure hydrogen chloride containing a minor proportion of water vapor and into a second fraction which is substantially constant boiling acid; and countercurrently contacting the substantially pure hydrogen chloride of the first fraction from the stripper with concentrated sulfuric acid and separately withdrawing therefrom substantially pure, dry hydrogen chloride gas and the sulfuric acid diluted with the water of said first fraction and mixing the acid and water with a further amount of sodium chloride in the furnace.

2. A method of producing substantially pure, dry hydrogen chloride gas which comprises in combination the following steps: reacting sodium chloride and sulfuric acid in a molar ratio of approximately two to one in a furnace heated internally by hot combustion gases whereby an initial gas mixture containing hydrogen chloride, water vapor and inert gaseous diluents is produced; countercurrently contacting said gaseous mixture with hydrochloric acid of strength greater than about 21% HCl in an absorber; withdrawing from the absorber an acid with a strength in the order of 32% HCl and separating it by fractionation in a stripper into a gas of about 90–98% HCl-content and into a residual acid of about 21% HCl concentration; withdrawing an absorber effluent gas at about 85° F.; and countercurrently contacting the substantially pure hydrogen chloride of the first fraction from the stripper with concentrated sulfuric acid and separately withdrawing therefrom substantially pure, dry hydrogen chloride gas and the sulfuric acid diluted with the water of said first fraction and mixing the acid and water with a further amount of sodium chloride in the furnace.

3. A method of producing substantially pure, dry hydrogen chloride gas which comprises in combination the following steps: reacting sodium chloride and sulfuric acid in a molar ratio of approximately two to one in a furnace heated internally by hot combustion gases whereby an initial gas mixture containing hydrogen chloride, water vapor and inert gaseous diluents is produced; countercurrently contacting said gas mixture with substantially constant boiling point hydrochloric acid in an absorber; withdrawing an acid from the absorber with a concentration of hydrogen chloride greater than that of constant boiling point acid and separating said acid by fractionation in a stripper into a first fraction which is substantially pure hydrogen chloride containing a minor proportion of water vapor and into a second fraction which is substantially constant boiling acid; withdrawing an effluent gas from said absorber; countercurrently contacting said effluent gas with the said second fraction of substantially constant boiling acid admixed with an acid of lower than constant boiling hydrogen chloride content in a saturator, while simultaneously adding heat thereto, and withdrawing a saturator effluent gas and an acid with a concentration substantially the same as that of constant boiling acid from the saturator and cooling and returning it to the absorber; countercurrently contacting said saturator effluent gas with a circulating body of dilute hydrochloric acid, said dilute hydrochloric acid having a concentration which is substantially the same as that corresponding to the hydrogen chloride in the effluent gas from the saturator together with an amount of water equivalent to the difference in water contents of the saturator effluent gas and the initial gas mixture; and countercurrently contacting the substantially pure hydrogen chloride of the first fraction from the stripper with concentrated sulfuric acid and separately withdrawing therefrom substantially pure, dry hydrogen chloride gas and the sulfuric acid diluted with the water of said first fraction and mixing the acid and water with a further amount of sodium chloride in the furnace.

4. A method of recovering hydrogen chloride from an initial gas mixture containing hydrogen chloride, water vapor and inert gaseous diluents which comprises countercurrently contacting said gas mixture with substantially constant boiling point hydrochloric acid in an absorber; withdrawing an acid from the absorber with a concentration of hydrogen chloride greater than that of constant boiling point acid and separating said acid by fractionation in a stripper into a first fraction which is substantially pure hydrogen chloride containing a minor proportion of water vapor and into a second fraction which is substantially constant boiling acid; withdrawing an effluent gas from said absorber; countercurrently contacting said effluent gas with the said second fraction of substantially constant boiling acid admixed with an acid of lower than constant boiling hydrogen chloride content in a saturator, while simultaneously adding heat thereto, and withdrawing a saturator effluent gas and an acid with a concentration substantially the same as that of constant boiling acid from the saturator and cooling and returning it to the absorber; and countercurrently contacting said saturator effluent gas with a circulating body of dilute hydrochloric acid cooled to a temperature such that the treated effluent gas will retain an amount of water vapor substantially identical with that in the initial gas mixture, said dilute hydrochloric acid having a concentration which is substantially the same as that corresponding to the hydrogen chloride in the effluent gas from the saturator together with an amount of water equivalent to the difference in water contents of the saturator effluent gas and the initial gas mixture.

5. A method of recovering hydrogen chloride from an initial gas mixture containing hydrogen chloride, water vapor and inert gaseous diluents which comprises countercurrently contacting said gas mixture with hydrochloric acid of strength in the order of 21% HCl; separately withdrawing therefrom a concentrated acid having a concentration substantially greater than 21% HCl and a first effluent gas; separating said concentrated acid by fractionation into a first fraction of substantially pure hydrogen chloride containing a minor proportion of water vapor and into a second fraction of substantially 21% HCl-content acid, said fractionation being carried out in a stripper which is heated by sensible heat of said initial gas transferred thereto by means of heat of vaporization of a portion of said second fraction of acid; countercurrently contacting said first effluent gas with the said second fraction of 21% acid admixed with an acid of less than 21% acid strength, while adding heat thereto, separately withdrawing therefrom a concentrated acid in the order of 21% HCl-content which is contacted with a further portion of said initial gas mixture, and a second effluent gas; and countercurrently contacting said second effluent gas with a circulating body of dilute hydrochloric acid, said dilute hydrochloric acid having a concentration which is substantially the same as that corresponding to the hydrogen chloride in the effluent gas from the saturator together with an amount of water equivalent to the difference in water contents of the saturator effluent gas and the initial gas mixture.

6. A method of recovering hydrogen chloride from an initial gas mixture containing hydrogen chloride, water vapor and inert gaseous diluents which comprises countercurrently contacting said gas mixture with hydrochloric acid of strength in the order of 21% HCl; separately withdrawing therefrom a concentrated acid having a concentration substantially greater than 21% HCl and a first effluent gas; separating said concentrated acid by fractionation into a first fraction of substantially pure hydrogen chloride containing a minor proportion of water vapor and into a second fraction of substantially 21% HCl-content acid, said fractionation being carried out in a stripper which is heated by sensible heat of said initial gas transferred thereto by means of heat of vaporization of a portion of said second fraction of acid, countercurrently contacting said first effluent gas with the said second fraction of 21% acid admixed with an acid of less than 21% acid strength, while adding heat thereto, separately withdrawing therefrom a concentrated acid in the order of 21% HCl-content which is contacted with a further portion of said initial gas mixture, and a second effluent gas; and countercurrently contacting said second effluent gas with a circulating body of dilute hydrochloric acid, said dilute hydrochloric acid having a concentration which is substantially the same as that corresponding to the hydrogen chloride in the effluent gas from the saturator together with an amount of water equivalent to the difference in water contents of the saturator effluent gas and the initial gas mixture, and withdrawing therefrom acid of substantially the same strength as said dilute acid in an amount which contains substantially the hydrogen chloride of said second effluent gas, and mixing it with the said second fraction of 21% acid.

7. A method of recovering hydrogen chloride from a gaseous mixture containing in the order of 10% hydrogen chloride, in the order of 2.5% water vapor and the remainder consisting of inert gaseous diluents, which comprises countercurrently contacting said gaseous mixture with hydrochloric acid of strength greater than about 21% HCl in an absorber; withdrawing from the absorber an acid with a strength in the order of 32% HCl and separating it by fractionation in a stripper into a gas of about 90–98% HCl-content and into a residual acid of about 21% HCl concentration; withdrawing an absorber effluent gas at about 86° F.; countercurrently contacting in a saturator said absorber effluent gas with said residual 21% HCl acid admixed with a minor proportion of acid of about 13% HCl concentration, while simultaneously adding heat thereto; withdrawing from the saturator hydrochloric acid of strength greater than about 21% HCl-content and delivering same to the absorber; withdrawing a saturator effluent gas at a temperature in the order of 135° F. and countercurrently contacting it in a tailing tower with a circulating body of hydrochloric acid of about 13% HCl content; withdrawing an effluent gas from the tailing tower at about 97° F. which is substantially free of hydrogen chloride and contains, for equal periods of time, an amount of water vapor and inert diluents equivalent to that in the said gaseous mixture; and withdrawing hydrochloric acid of about 13% HCl concentration formed in the tailing tower and delivering it to the saturator.

8. A method of recovering hydrogen chloride from a gaseous mixture containing hydrogen chloride, water vapor and inert gaseous diluents while simultaneously increasing the water vapor content of the mixture to a predetermined value, which comprises countercurrently contacting the said gaseous mixture with hydrochloric acid of HCl-strength less than constant boiling point acid, while adding heat thereto, and withdrawing effluent gas therefrom, containing hydrogen chloride, water vapor and inert gaseous diluents, at a temperature such that the amount of water vapor is greater than said predetermined value; and countercurrently contacting the said effluent gas with a circulating body of dilute hydrochloric acid cooled to a temperature such that the treated effluent gas will retain an amount of water vapor substantially identical with said predetermined value.

9. A method of recovering hydrogen chloride from a gaseous mixture containing hydrogen chloride, water vapor and inert gaseous diluents while simultaneously increasing the water vapor content of the mixture to a predetermined value, which comprises countercurrently contacting the said gaseous mixture with hydrochloric acid of less than about 21% HCl content, while adding heat thereto, and separately withdrawing therefrom effluent gas at a temperature such that the amount of water vapor therein is greater than said predetermined value, and hydrochloric acid of greater than 21% HCl concentration; and countercurrently contacting the said effluent gas with a circulating body of dilute hydrochloric acid cooled to a temperature such that the treated effluent gas will retain an amount of water vapor substantially identical with said predetermined value.

10. A method of recovering hydrogen chloride from a gaseous mixture containing hydrogen chloride, water vapor and inert gaseous diluents while simultaneously increasing the water vapor content of the mixture to a predetermined value, which comprises countercurrently contacting the said gaseous mixture with hydrochloric acid of less than about 21% HCl content, while adding heat thereto, and separately withdrawing therefrom effluent gas at a temperature such that the amount of water vapor therein is greater than said predetermined value, and hydrochloric acid of greater than 21% HCl concentration; and countercurrently contacting the said effluent gas with a circulating body of dilute hydrochloric acid cooled to a temperature such that the treated effluent gas will maintain an amount of water vapor substantially identical with said predetermined value, said dilute hydrochloric acid having a composition corresponding to the hydrogen chloride in the said effluent gas mixed with the water difference between the water in said effluent gas and the predetermined water value.

11. A method of recovering hydrogen chloride from a gaseous mixture containing hydrogen chloride, water vapor and inert gaseous diluents while simultaneously increasing the waper vapor content of the mixture to a predetermined value, which comprises countercurrently contacting the said gaseous mixture with hydrochloric acid of less than about 21% HCl content, while adding heat thereto, and separately withdrawing therefrom effluent gas at a temperature such that the amount of water vapor therein is greater than said predetermined value, and hydrochloric acid of greater than 21% HCl concentration; countercurrently contacting the said effluent gas with a circulating body of dilute hydrochloric acid cooled to a temperature such that the treated effluent gas will retain an amount of water vapor substantially identical with said predetermined value, said dilute hydrochloric acid having a composition corresponding to the hydrogen chloride in the said effluent gas mixed with the water difference between the water in said effluent gas and the predetermined water value; and withdrawing therefrom acid of substantially the same strength as said dilute hydrochloric acid in an amount which contains substantially the hydrogen chloride of said effluent gas, and mixing it with substantially 21% acid to form said hydrochloric acid of less than about 21% HCl content for contacting the gaseous mixture.

12. A method of recovering hydrogen chloride from a gaseous mixture containing hydrogen chloride, water vapor and inert gaseous diluents while simultaneously increasing the water vapor content of the mixture to a predetermined value, which comprises simultaneously countercurrently contacting the said gaseous mixture and vaporized substantially constant boiling point hydrochloric acid with hydrochloric acid of HCl-strength less than constant boiling point acid, and separately withdrawing therefrom hydrochloric acid of HCl-strength greater than constant boiling point acid and effluent gas containing hydrogen chloride and having a water content greater than the predetermined value; subsequently countercurrently contacting the said effluent gas with a circulating body of dilute hydrochloric acid cooled to a temperature such that the treated effluent gas will retain an amount of water vapor substantially identical with said predetermined value; and withdrawing from the circulating body of acid an amount of dilute acid which contains an amount of hydrogen chloride equivalent to the hydrogen chloride in said effluent gas.

13. A method of recovering hydrogen chloride from a gaseous mixture containing in the order of 0.3% hydrogen chloride, in the order of 2% water vapor, and the remainder consisting of inert gaseous diluents, which comprises countercurrently contacting said gaseous mixture with hydrochloric acid of about 21% HCl-content admixed with a minor proportion of about 13% HCl acid, while adding heat thereto to maintain an effluent gas temperature of about 135° F.; separately withdrawing therefrom hydrochloric acid of about 22.5% HCl concentration and effluent gas at about 135° F.; countercurrently contacting said effluent gas with circulating hydrochloric acid of about 13% HCl concentration separately cooled to about 97° F. to recover substantially all of the hydrogen chloride gas therefrom; withdrawing 13% acid therefrom and mixing it with about 21% acid for contacting a further portion of said gaseous mixture; and withdrawing an effluent gas containing not more than about 0.02 hydrogen chloride.

JULIUS E. NACHOD.
OWEN W. RIDEOUT.
JAMES H. SHAPLEIGH.

REFERENCES CITED

The following references are of record in the file of this patent:

UNITED STATES PATENTS

| Number | Name | Date |
| --- | --- | --- |
| 1,764,593 | Adamson | June 17, 1930 |
| 1,853,330 | Barstow | Apr. 12, 1932 |
| 1,906,467 | Heath | May 2, 1933 |
| 2,220,570 | Hurt | Nov. 5, 1940 |